United States Patent [19]

Faxvog

[11] 4,306,525
[45] Dec. 22, 1981

[54] ENGINE OIL INDICATOR

[75] Inventor: Frederick R. Faxvog, Rochester, Mich.

[73] Assignee: General Motors Corporation, Detroit, Mich.

[21] Appl. No.: 149,288

[22] Filed: May 12, 1980

[51] Int. Cl.³ .............................................. F02M 1/00
[52] U.S. Cl. .................................. 123/196 S; 73/293; 123/198 D
[58] Field of Search ........................ 73/293, DIG. 11; 123/198 D, 196 R, 196 S

[56] References Cited
U.S. PATENT DOCUMENTS

| 1,913,436 | 6/1933 | Eckstein | 123/196 S |
| 4,155,013 | 5/1979 | Spiteri | 73/293 |
| 4,167,172 | 9/1979 | Bassoli | 123/196 S |
| 4,192,186 | 3/1980 | Quinn | 73/293 |

Primary Examiner—Ronald B. Cox
Attorney, Agent, or Firm—Warren D. Hill

[57] ABSTRACT

A single optical sensor coupled to an oil return line in an internal combustion engine is coupled to a control circuit for determining during a first time interval when the engine is started whether the crankcase oil level is sufficient and during a second time interval after the engine is running whether the oil needs to be changed.

3 Claims, 4 Drawing Figures

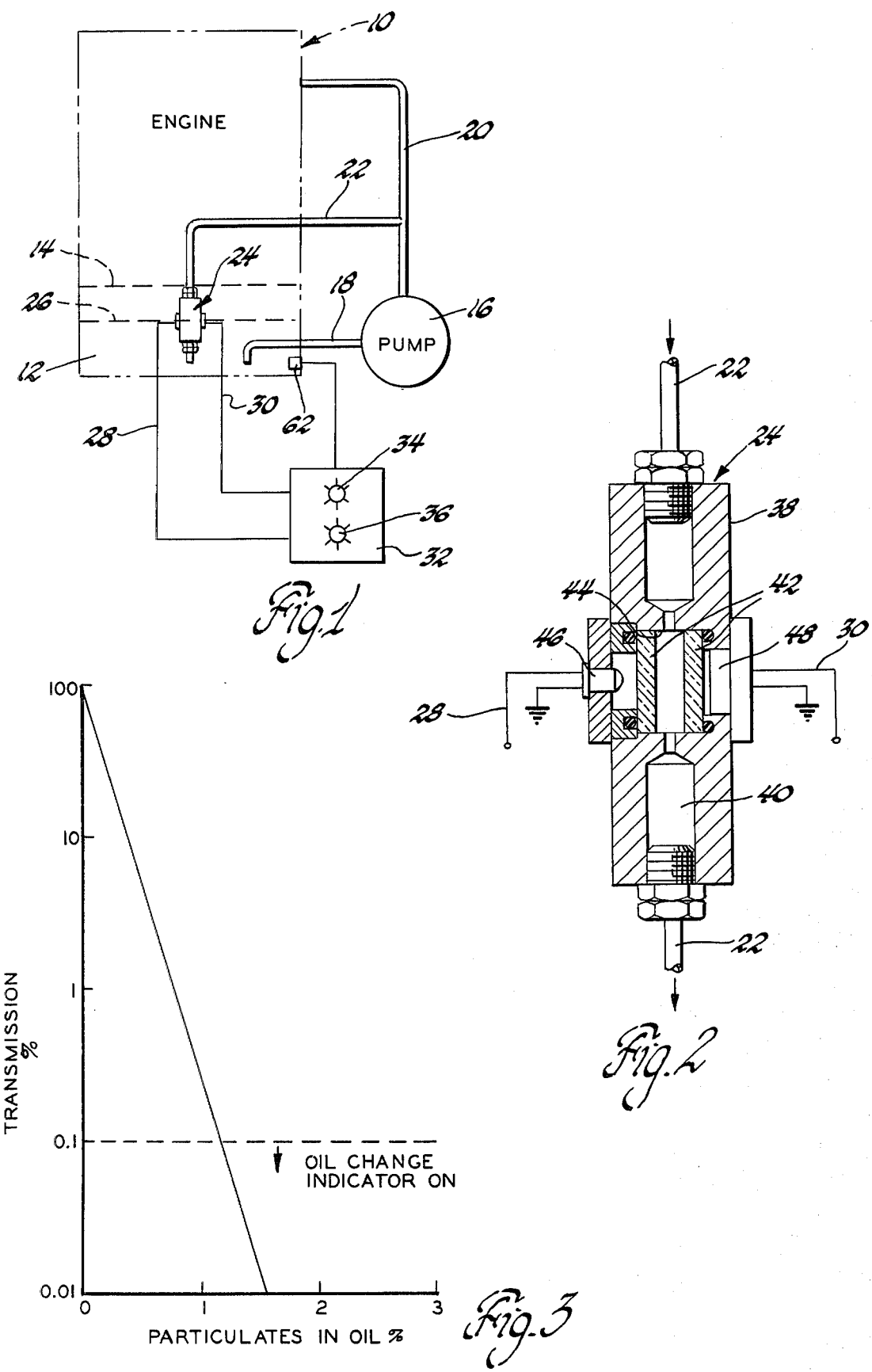

ENGINE OIL INDICATOR

This invention relates to an engine oil indicator in an internal combustion engine and particularly to such an indicator which determines whether the oil level is sufficient and whether the oil needs to be changed.

It is desirable in an internal combustion engine to maintain the oil at a minimum level in the crankcase as measured when the engine is not running or when the engine has just started and the oil level in the engine sump has not been greatly affected. It is also desirable to monitor the oil condition to determine when it should be changed. This is especially true in diesel engines wherein soot particulates contaminate the oil. Although a number of prior arrangements have been proposed for detecting these engine oil conditions and providing indications thereof, they have required separate systems or at least separate sensors within a system.

It is therefore a general object of the invention to provide an engine oil indicator using a single sensor for revealing when the oil level is below a prescribed value and for revealing when oil should be changed. It is a further object of the invention to provide such an indicator utilizing a sensor comprising a radiation source and detector coupled with a circuit for determining oil level and oil opacity.

The invention is carried out by providing in an internal combustion engine having an oil return line carrying a portion of the engine oil to the sump, an optical sensor in the return line at a position representing the minimum allowable oil level and a control circuit for determining during a first time interval at about the time the engine is first started whether the engine oil is above the minimum level and for determining during a second later time interval whether the oil in the return line is within allowed opacity limits thereby revealing whether it needs to be changed, and indicators responsive to the oil level and opacity conditions.

The above and other advantages will be made more apparent from the following specification taken in conjunction with the accompanying drawings wherein like reference numerals refer to like parts and wherein:

FIG. 1 is a schematic view of an engine and an engine oil indicator according to the invention.

FIG. 2 is a cross-sectional view of an optical sensor coupled to an oil return line of the engine of FIG. 1, FIG. 3 is a graph depicting the light transmission through engine oil versus the amount of soot particulates in oils.

Figure 4:
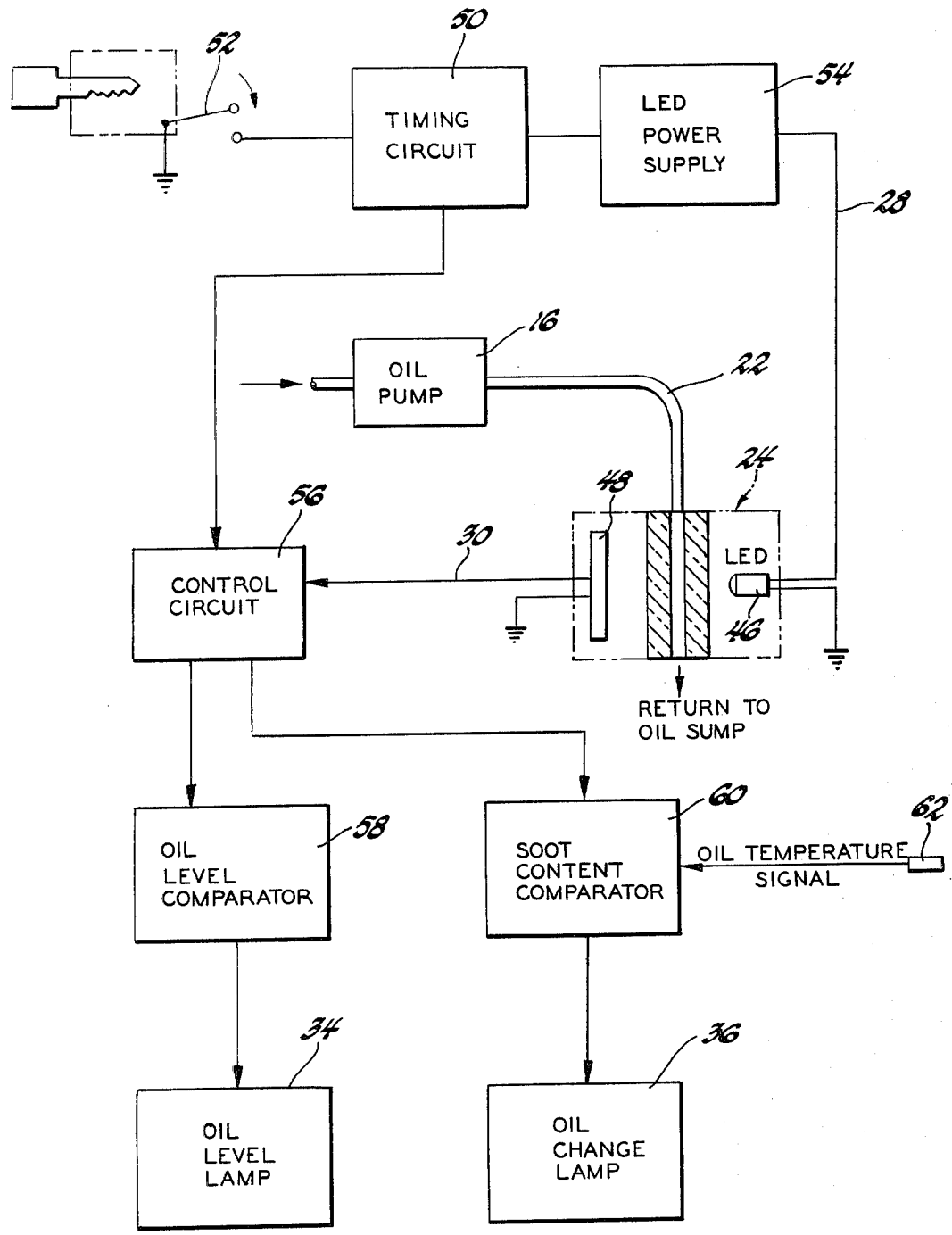
FIG. 4 is a block diagram of an electronic control for the engine oil indicator according to the invention.

Referring to FIG. 1 an engine 10 has an oil sump 12 in the bottom thereof which contains oil having a normal level indicated by a dotted line 14. A pump 16 (actually located within the engine) is connected by lines 18 and 20 between the sump 12 and lubricating passages in the engine in a manner which is well-known in the art. A return line 22 bypasses a portion of the engine oil from the line 20 back to the sump 12. An optical sensor 24 in the return line 22 is positioned below the normal oil level 14 at a level which represents the minimum allowable oil level as shown by the dotted line 26. It will be understood that the levels 14 and 26 are those which occur when the engine is off and the oil has drained into the sump or when the engine has first started and a significant amount of oil has not yet been pumped from the sump. The optical sensor 24 is connected by lines 28 and 30 to a control circuit 32 having indicator lamps 34 and 36 which are selectively lit to signal a low oil level condition or a dirty oil condition.

The optical sensor 24 is shown in FIG. 2. There the return line 22 is coupled to a sensor housing 38 having a traversing passage 40 which passes between a pair of spaced windows 42. The windows 42 are sealingly nested in a cavity 44 of the housing 38 and a light source 46 and a detector 48 are located at opposite windows. Preferably the light or radiation source 46 is a light emitting diode which emits radiation in either the visible or infrared range and the detector 48 comprises a silicon photovoltaic cell to sense the emitted radiation. The signal output on line 30 will vary according to the light transmission from the source to the detector and thus will reflect the presence of oil between the source and detector and further will reflect the light transmission of the oil as determined by the oil opacity. This will be a measure of the soot particle content of the engine oil. Thus, the amplitude of the signal on line 30 can be analyzed to provide a qualitative indication of oil presence or absence within the return line and to provide a measure of the soot content.

As shown in the graph of FIG. 3, the amount of light transmission through the oil filled gap is a logarithmic function of the percentage of soot particulates in the oil. The data represented by the curve of FIG. 3 was taken in an engine with a window spacing of 0.1 mm using a GaAs LED having a light output of 1 mw at 0.94 $\mu$m wavelength and operating at 2.5 v and 100 ma.

The electronic control circuit shown in FIG. 4 comprises a timing circuit 50 connected to a key switch 52 which initiates engine operation and also initiates cycling of the timing circuit 50. The timing circuit has an output connected to an LED power supply 54 which supplies power on line 28 to the LED 46 in the optical sensor thereby causing radiation emission from the LED. The timing circuit 50 also has an output connected to a control circuit 56 which has a further input comprising line 30 from the detector 48. The control circuit 56 has one output connected to an oil level comparator 58 which has as its output the oil level indicator lamp 34. The second output of the control circuit 56 is connected to a soot content comparator 60 which has as its output the oil change indicator lamp 36.

In operation the timing circuit 50 is effective to generate output signals during two time intervals for controlling the sampling of the detection output signal. The first time interval occurs when the key switch 52 is first operated. During that time interval the LED power supply is energized to cause illumination of the LED 46 and the control circuit 56 is energized to admit the signal on line 30 from the detector to the oil level comparator. The oil level comparator then compares that signal to a preset threshold signal which represents a signal level slightly higher than that which would be obtained by light transmission through clean engine oil. Then if oil is present at the optical sensor during the first time interval, the signal on line 30 will be lower than the threshold signal in the comparator 58 so that the comparator produced no output. If, however, the engine oil level is below the minimum height and there is no oil present in the optical sensor, then the signal on line 30 will be higher than that of the reference level set in the comparator 58 and the comparator will have an output which energizes the oil level lamp 34. This measurement and indication can occur within a fraction of a second after closing the key switch 52 so that the oil level can be checked before engine starting causes pumping of oil from the pump.

The second time interval during which the timing circuit 50 produces outputs should occur a few minutes after the initial time interval in order to assure than the engine is operating and engine oil is being pumped through the return line 22 and through the sensor 24. During the second time interval, the LED power supply 54 will be energized to cause illumination of the LED 46 and the control circuit 56 will be energized to direct the signal on line 30 from the detector 42 to the soot content comparator 60. That comparator 60 has a reference threshold therein which represents the value of the signal 30 which occurs at the maximum permissible soot content of the engine oil. The comparator 60 is thus constructed so that when the signal on line 30 has a higher value than the reference signal indicating the permissible soot content the comparator 60 will have no output whereas if the signal on line 30 has a lower value, indicating an objectionable soot content, the comparator 60 will have an output to illuminate the oil change lamp 36.

It is advantageous to make the soot content comparison before the engine oil has a change to heat up to prevent interference from the oil's infrared radiation. In case the oil is already hot, it is desirable to prevent a soot measurement. A thermocouple 62 in the oil and connected to the soot content comparator 60 is effective to inhibit the comparator when the oil temperature is high.

It will thus be seen that by using a single optical sensor and placing it appropriately in the oil return line at the minimum oil level in the crankcase sump two different conditions can be monitored by appropriate control so the oil level and the soot content of the oil are readily obtained each time the engine is started. While the invention is especially desirable for diesel engines which produce a high soot content in the engine oil, it is also adaptable to gasoline engines to monitor oil level and to determine the need for an oil change.

The embodiments of the invention in which an exclusive property or privilege is claimed are defined as follows:

1. An engine oil indicator in an internal combustion engine having an oil sump, an oil pump for distributing oil from the sump throughout the engine, and a return line carrying a portion of the pumped oil back to the sump comprising
   an optical sensor coupled to the return line at a location below the normal oil level so that when the engine is off the sensor is immersed in oil when the oil level is normal and is above the oil when the oil level is substantially below normal,
   the sensor comprising a radiation source spaced from a radiation detector and arranged to pass the radiation through a fixed thickness of oil contained in the return line, the detector having an electrical output signal level varying according to the light transmission from the source to the detector whereby the presence of oil and its opacity can be determined from the signal, and
   a circuit responsive to the output signal for sampling the signal during a first time interval approximately when the engine is first started for determining whether the oil level is low and providing an indication thereof and for sampling the signal during a second time interval later than the first time interval for determining whether the oil opacity exceeds a preset limit and providing an indication thereof.

2. An engine oil indicator in an internal combustion engine having an oil sump, an oil pump for distributing oil from the sump throughout the engine, and a return line carrying a portion of the pumped oil back to the sump comprising
   an optical sensor coupled to the return line at a location below the normal oil level so that when the engine is off the sensor is immersed in oil when the oil level is normal and is above the oil when the oil level is substantially below normal,
   the sensor comprising a radiation source spaced from a radiation detector and arranged to pass the radiation through a fixed thickness of oil contained in the return line, the detector having an electrical output signal level varying according to the light transmission from the source to the detector whereby the presence of oil and its opacity can be determined from the signal, and
   a circuit responsive to the output signal for sampling the signal during a first time interval when the engine is first started and including a first comparator for comparing the signal to a first threshold valve to verify the presence of oil for determining whether the oil level is low and providing an indication thereof and for sampling the signal during a second time interval later than the first time interval and including a second comparator for comparing the signal to a second threshold valve for determining whether the oil opacity exceeds a preset limit and providing an indication thereof.

3. An engine oil indicator in an internal combustion engine having an oil sump, an oil pump for distributing oil from the sump throughout the engine, and a return line carrying a portion of the pumped oil back to the sump comprising
   an optical sensor coupled to the return line at a location below the normal oil level so that when the engine is off the sensor is immersed in oil when the oil level is normal and is above the oil when the oil level is substantially below normal,
   the sensor comprising a pair of spaced windows defining a passage of fixed thickness for carrying the oil flow through the return line, a light emitting diode adjacent one window outside the passage for passing radiation through the passage, and a radiation detector adjacent the other window and exposed to radiation transmitted through the oil, the detector having an electrical output signal level varying according to the light transmission from the source to the detector whereby the presence of oil and its opacity can be determined from the signal, and
   a circuit responsive to the output signal for sampling the signal during a first time interval when the engine is first started for determining whether the oil level is low and providing an indication thereof and for sampling the signal during a second time interval later than the first time interval for determining whether the oil opacity exceeds a preset limit and providing an indication thereof.

* * * * *